Figure 1:
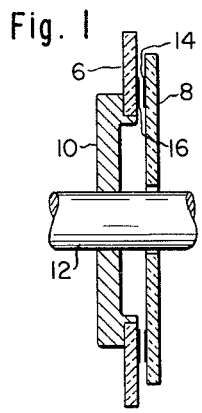

Oct. 14, 1952     L. FEIN     2,614,171
ELECTRICAL APPARATUS FOR MEASURING ANGLES
Filed Dec. 7, 1948     2 SHEETS—SHEET 1

INVENTOR
Louis Fein
BY Kenway Jenney Witter & Hildreth
ATTORNEYS

Oct. 14, 1952  L. FEIN  2,614,171
ELECTRICAL APPARATUS FOR MEASURING ANGLES
Filed Dec. 7, 1948  2 SHEETS—SHEET 2

INVENTOR
Louis Fein
BY Kenway Jenney Witter
& Hildreth
ATTORNEYS

Patented Oct. 14, 1952

2,614,171

UNITED STATES PATENT OFFICE 2,614,171

ELECTRICAL APPARATUS FOR MEASURING ANGLES

Louis Fein, Arlington, Mass., assignor, by mesne assignments, to Edward G. Martin, Cambridge, Mass.

Application December 7, 1948, Serial No. 63,935

13 Claims. (Cl. 178—44)

The present invention relates to measuring apparatus and is more particularly concerned with apparatus functioning in the manner of self-synchronous devices. As is well-known, self-synchronous devices are ordinarily used to produce electrical signals as a function of angle. The apparatus of the present invention is similarly useful and may be employed wherever an electrical signal as a function of a precision measurement is required.

A major use of such self-synchronous devices is in the field of servomechanisms. As is well-known in that art two or more speeds so-called are used for accurate indications of angle. First, a one-speed or low-speed system, from which the error signal goes through one electrical cycle with rotation through one mechanical cycle, will roughly indicate the angle being measured. Then, a high-speed system, for which the electrical error signal changes through 360 degrees with rotation through a very minute angle, makes a finer measurement. As a result of the combined use of these coarse and fine systems a high degree of precision in angular measurements is attainable.

An object of this invention is to provide a simple low speed system for use with a high speed system, particularly with apparatus usable as a high speed system of the type described in the prior application of Childs, Serial No. 794,192 filed December 27, 1947.

Another object is to provide a simple measuring device for angular measurement which will be particularly adapted for use where a high frequency input voltage is readily available.

With these objects in mind, the present invention comprises two relatively movable members upon each of which are positioned metallic bands which face each other across a narrow air gap. Each band is part of a closed circuit and the operation of the whole device to indicate displacement between the relatively movable members depends upon the distributed capacitance between the bands and the distributed resistance in the bands. Each member provides an insulating support for the bands. The actual construction of my invention may take several forms. For an angle-measuring device, the bands are disposed in a ring around a drum, or preferably upon the face of a flat disk. The bands may be thin layers of evaporated silver or similar metal with distributed resistance along its length. The bands must be arranged so that with an alternating current voltage impressed across one band, the "primary," the capacitively- coupled voltage in the other band or "secondary" is a known function of the relative displacement between the bands. Preferably the band on the primary or rotor is a continuous closed loop with terminals on the loop at opposite ends of a diameter of the loop. The secondary or stator band is then a loop opened at one point to bring out two terminals, or for a three-phase error voltage the stator band is a continuous closed loop with terminal connections brought out at points spaced 120° apart.

Other features of my invention consist of certain novel features of construction, combinations and arrangements of parts which are hereinafter described and particularly defined in the claims.

Figure 2:
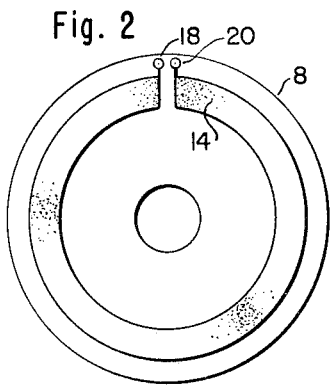
Figure 3:
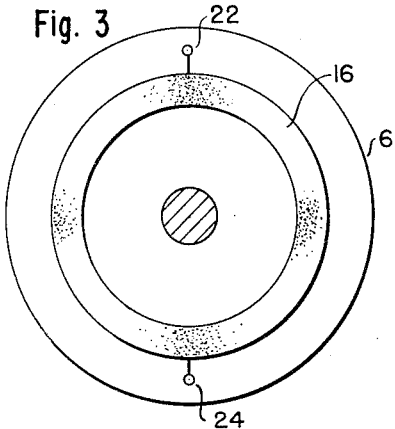
Figure 4:
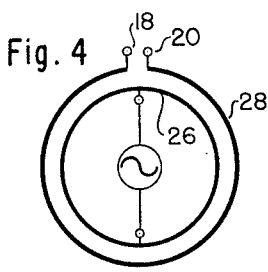
Figure 7:
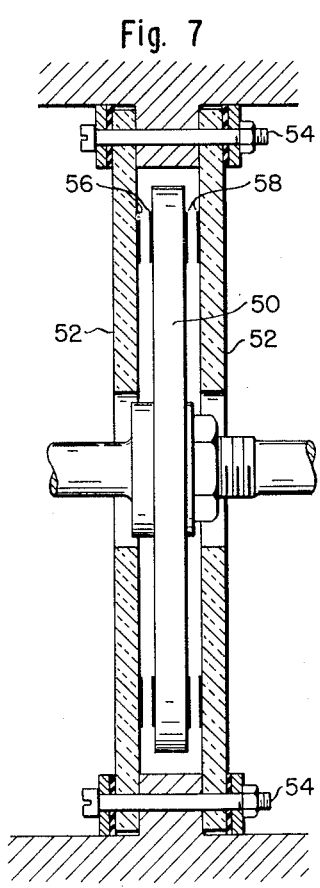
Figure 5:
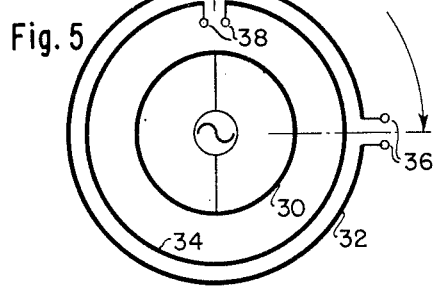
Figure 6:
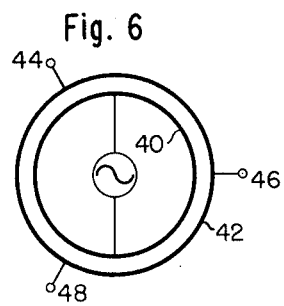
Figure 8:
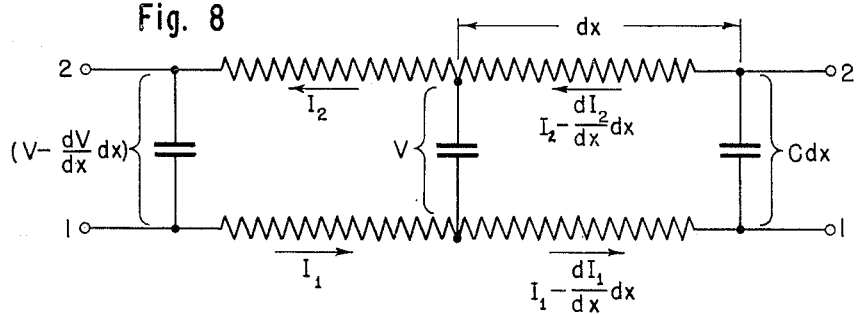
Figure 9:
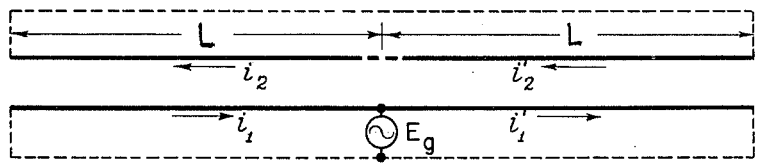
Figure 10:
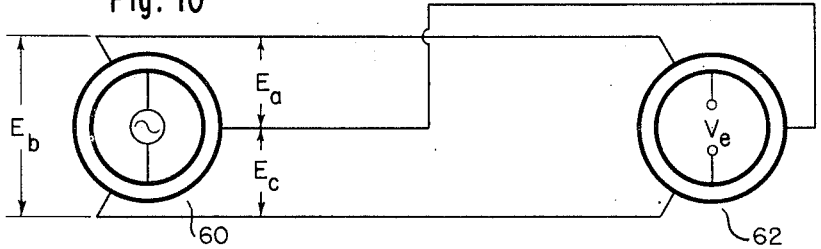
Figure 11:
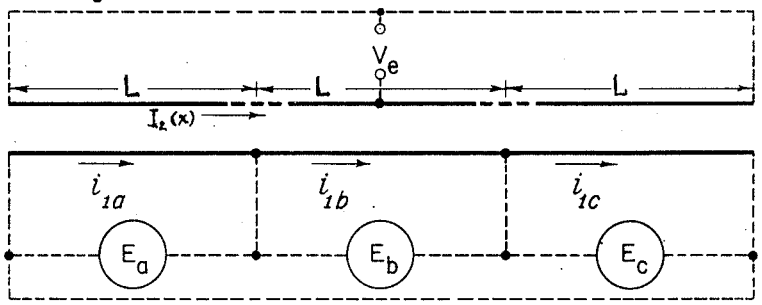

In the accompanying drawings Fig. 1 is a sectional elevation of one form of the invention, Fig. 2 is a face view of the stator of Fig. 1; Fig. 3 is a face view of the preferred rotor for the apparatus of Fig. 1; Fig. 4 is a schematic representation of stator and rotor bands for a single-phase device embodying my invention; Fig. 5 is a schematic representation of a two-phase device; Fig. 6 is a schematic representation of a three-phase device; Fig. 7 is sectional elevation showing the construction of a device combining the low speed system of this invention with the fine control system described in the prior Childs application; Fig. 8 is a diagram illustrating the network equivalent of a differential element along the two bands; Fig. 9 is a schematic representation of the single-phase device of Fig. 4 as two transmission lines for purposes of a mathematical analysis of the operation of the present invention; Fig. 10 is a schematic circuit diagram showing the use of a pair of three-phase measuring devices similar to that of Fig. 6, connected in a manner useful for servo-mechanisms applications, and Fig. 11 is a schematic representation of the three-phase device as three transmission lines for the purpose of analyzing the operation of the system shown in Fig. 10.

The illustrated embodiment of my invention (Fig. 1) comprises a primary member 6 and a secondary member 8, of which one, preferably the primary, is a rotor, while the other is a stator as shown in Fig. 4. The stator and rotor may comprise disks, preferably of glass, arranged face-to-face with a small air gap between them. The rotor is suitably mounted on a hub or spider 10 which in turn is mounted on a shaft 12. The stator carries a deposited metallic band indicated by heavy lines 14 on Fig. 1 and the rotor carries a similar deposit 16 opposed to deposit 14.

The stator with its metallic band 14 is shown in Fig. 2. The band is disposed in circular fashion upon the face of the stator disk. The terminals 18 and 20 are connected to the ends of the open loop formed by the band.

The electrically conducting metallic band 16 on the rotor with its terminals 22 and 24 is shown in Fig. 3. In this embodiment the rotor band, in the same way as the stator band, is deposited in circular fashion upon the face of the rotor disk. However, as distinguished from the stator, the rotor band in this preferred embodiment of the invention forms a closed loop and terminals 22, 24 are brought out at diametrically opposite points on the loop. The reason for using a rotor band of a form different from that of the stator will be explained presently. A device using the rotor and stator of Figures 2 and 3 may be as shown schematically in Fig. 4, reference numbers 26 and 28 indicating the rotor and stator rings, respectively. When an alternating current voltage is applied to the rotor band 16, an output voltage appears across terminals 18 and 20 that is approximately a sinusoidal function of rotor angular position.

Other embodiments of the invention and ones which are preferred for use in servomechanisms are shown schematically in Figures 5 and 6. The two-phase system of Fig. 5 has a rotor 30 similar to the rotor 26 of the device shown in Fig. 4. However, the stator has deposited upon it two concentric metallic bands 32 and 34. One band 32 has its terminals 36 displaced 90 degrees from terminals 38 of the other band 34. As a result there is a 90-degree phase difference between the bands.

A system for producing three output voltages that are individually sinusoidal functions of rotor angular position, but are displaced 120 degrees from one another is shown in Fig. 6. The metallic band 40 on the rotor is of the same type as the same diameter-connected, closed-loop type shown in Fig. 3. However, the stator band 42 is formed in a closed loop and connections are made to the unbroken loop at three points 44, 46, 48 spaced 120° apart. Each of the sections of the loop between the terminals acts like the whole stator ring of Fig. 4 insofar as it has coupled into it a capacitive voltage that is a sinusoidal function of rotor position. However, because of the positional separation of the terminals, a three-phase voltage will appear at the terminals; in other words, at a given position of the rotor the magnitudes of the voltage between the pairs of terminals 44—46, 46—48, and 48—44 may be represented as three sine waves spaced 120° from one another. As will be readily understood by persons skilled in the art, apparatus producing voltage in space phase from one another is utilized in many servomechanisms applications.

In many applications of devices similar to the illustrated embodiment of this invention, particularly in applications in servomechanisms, two systems of differing sensitivity are used to attain desirable precision of angular measurement. A coarse or low speed system indicates roughly the angle of rotation, after which a fine or high speed system is switched in to measure the angle accurately within the range indicated by the coarse system. A device in accordance with my present invention is suited to be used as the low-speed or coarse-measuring system. It is particularly adapted to use with apparatus of the general type described in the Childs application above referred to. In that application, a measuring apparatus is described in which the electrical output voltage changes in magnitude through many cycles with a single rotation of the rotor. Thus, such apparatus may be used for the high-speed or fine-measurement system of a servomechanism. The apparatus of the prior application consisted of a stator and rotor upon each of which a series-connected winding is disposed to form a plurality of conductor elements. A high frequency input voltage is used in the device in order to permit use of a non-ferrous mount for the device. The high frequency input voltage used in the Childs invention may likewise be effectively used in the present device, and permits the capacitive bands to be relatively small and yet provide appreciable capacitively-coupled output voltage. A further advantage is that the present device can be used as the low speed or coarse-control system along with the high-frequency fine-control system without necessitating two sources of input voltage.

Fig. 7 shows a particular form of a dual speed system combining one embodiment of the present invention with an embodiment of the invention in the Childs application. A rotor 50 in the form of a disk, preferably of glass, is mounted with a stator plate 52, also preferably a glass disk, on either side of the rotor disk. The stator plates are rigidly attached to the support by bolts 54. Upon one stator plate and the opposing face of the rotor are disposed windings of the multi-conductor type described in the Childs application, these windings being indicated by the heavy lines 56. On the other stator plate and its opposing rotor face are the high-resistance capacitive bands 58 in accordance with my present invention. An economy of parts results from the construction shown in Fig. 7 since one rotor serves both the high and low-speed measuring devices.

The operation of the invention may be explained in the following manner: First referring to Fig. 4, it will be seen that the maximum potential difference appears across a diameter of the rotor conductor 26. In the position shown in the drawing equal potentials are capacitively induced in the left-hand and right-hand sides of the stator ring 28; therefore, the potential difference between terminals 18 and 20 is zero. If the rotor is turned through 90° so that the rotor terminals lie on a horizontal line, the points of maximum potential difference on the ring 28 likewise lie on diametrically opposite points on a horizontal line. One of the stator terminals, say 18, is at some instant only 90° removed from the point of minimum potential, while the terminal 20 is at the same instant 90° removed from the point of maximum potential. Therefore, the maximum potential difference appears between the terminals 18 and 20. At intermediate angular positions of the rotor, the terminal voltage between terminals 18 and 20 will be between zero and the maximum. The exact value of terminal potential for any angular position depends upon the relative values of resistance and capacitance, but it is readily seen that if the resistance were zero there would be no terminal voltage at any position of the rotor. On the other hand, for reasons which will be apparent in the mathematical analysis, a fairly low value of resistance is desired in order to give a nearly sinusoidal variation of terminal potential with angle.

In the structure shown in Fig. 6, wherein a closed loop is used for the stator, and terminal connections are made into the loop, preferably for polyphase operation, it may be seen that since the potential difference is a maximum across the terminal of the rotor 40, the capacitively coupled stator voltage will also be a maximum opposite the rotor terminals. Hence, as the rotor is moved to any position, the stator terminal voltages will vary in accordance with the position. For the three-phase unit of Fig. 6 the terminal voltages are in space phases differing by 120° although all voltages are in the same time phase.

The operation of my invention is best demonstrated by a mathematical treatment. Fig. 8 shows a differential element of the stator and rotor bands of my device, line 1—1 representing the primary member or rotor and line 2—2, the secondary member or stator. It will be recognized that this element is identical with that of a transmission line with the exception that the distributed inductance of the usual transmission line is missing from the differential element of my device. The customary transmission line analysis can be used to show that the secondary current $I_2$ is almost a sinusoidal function of the rotor angular displacement. The differential equations associated with the two elementary meshes of Fig. 8 are as follows:

$$\frac{dV}{dx} + Z_1 I_1 + Z_2 I_2 = 0$$

$$\frac{dI_1}{dx} + yV = 0$$

$$\frac{dI_2}{dx} + yV = 0$$

where the letters carry the following meaning:

$x$ = distance along the band.
$Z_1$ and $Z_2$ = resistance per unit length of lines 1 and 2, respectively.
$y = j\omega C$ per unit length.

The general solution of these equations is easily carried out by methods familiar in transmission line analysis. The final solution requires the imposition of boundary conditions. Because of the diameter-connected rotor the system is best represented by two transmission lines (Fig. 9), with L representing the length of each and $E_g$ being the voltage input to the rotor. From Fig. 9 the boundary conditions necessary for solution of the above differential equations for two transmission lines may be written. It is then found that the secondary current as a function of $x$ is:

$$I_2(x) = E_g \frac{\sinh PL - \sinh Px - \sinh P(L-x)}{\frac{2Z_1}{P}(1 - \cosh PL) - LZ_2 \sinh PL}$$

where $$P = \sqrt{(Z_1 + Z_2)y}$$

Since $y$ is nearly a pure imaginary quantity and the $Z$'s are real, $P$ is complex. The terminal voltage (i. e. the voltage at the terminals 18, 20 of Fig. 4) may be found by integrating the product of $I_2(x)$ and $Z_2$ along the entire band.

If $P$ is small, both $I_2$ and the terminal voltage are nearly sinusoidal functions of angular position of the rotor. Although a sinusoidal variation is not important for some applications, it is useful when the apparatus is used for angular measurement, since the angular position of the rotor may then be determined with considerable accuracy from the terminal voltage.

For any value of $P$, the magnitude of the output voltage is proportional to the product $E_g \omega C Z_2$. For a given input voltage, the output voltage may be increased by increasing $\omega$, $C$ or $Z_2$. This indicates the desirability of a high frequency, and also a large value of $Z_2$. The value of $Z_1$ is determined by the impedance match with the generator, and in general will be smaller than $Z_2$.

If $Z_1$ is considerably smaller than $Z_2$, the value of $/P/^2$ is given approximately by $\omega C Z_2$, in which case the output voltage is also approximately proportional to $/P/^2$. While this indicates the desirability of a large P, other considerations tend to show that P should not be excessively large. In a data transmission system for use in a servomechanism, it is desirable that the phase of the output voltage should change rapidly with respect to $x$ in the neighborhood of $x=0$, $x=L$, etc. It can be shown that this is best accomplished by the use of a small P. In general, the value of P for best phase conditions is less than 1. It has been found, however, that entirely satisfactory phase conditions, consistent with output voltages of useful magnitude, may be obtained over a fairly wide range of values of the parameters.

In the three-phase device of Fig. 6 three points 120° apart will have voltages between pairs of them that are similarly sinusoidal functions of rotor displacement, but the voltages are displaced in space 120 degrees from each other. Thus, the three-phase device has three output voltages similar to those of the so-called synchro generator of the usual servomechanism.

Furthermore, it can be shown that in spite of the slight variance of the output voltage from a sine function of angle, a servomechanism system using two devices incorporating this invention and connected back-to-back in the way customary in the art (Fig. 10) will produce an error voltage that is a sinusoidal function of angular displacement. Fig. 10 shows a system using devices like that portrayed in Fig. 6 for the synchro generator 60 and the control transformer 62. The rotor of the unit 60 is energized at high frequency, say 100 kc. The stators of the two units are connected together. The output voltage of unit 62 is $V_e$. This is the error voltage which varies in magnitude with the angular difference between the positions of the rotors of the synchro-generator and the control transformer. A mathematical analysis similar to that used above may be followed. Because the input to the control transformer is three-phase, three equivalent transmission lines are needed (Fig. 11) to represent it and nine boundary conditions are necessary to solve the differential equations. The voltages $E_a$, $E_b$, and $E_c$ are the output voltages from the synchro-generator and are readily determined from the above expression for $I_2(x)$.

The boundary conditions to be applied are: first, three relations connecting $E_a$ and $i_{1a}$, etc., and second, six relations expressing the equality of voltage and current at the end of one section with the corresponding quantities at the beginning of the next section. Substitution of these boundary conditions into the general solution of the transmission line results in a solution for the current in the secondary of the control transformer, which proves to be a sine function of the rotor displacement when the E's are assumed to be sine functions differing in space phase by 120°. Since the error voltage produced by the control transformer is the integral of the voltage drop produced by the current in the secondary, the error voltage varies sinusoidally as a function of rotor angular difference. Thus, the error voltage is of the same form in apparatus of my invention as in other self-synchronous devices commonly used in servomechanisms.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims. For example, the capacitive band of the rotor may be given exactly the same form as the stator band illustrated in Fig. 2. Also, a device using linearly arranged spaced capacitive bands may effectively be employed for applications where it is required accurately to measure linear displacements.

Having thus described my invention, I claim:

1. Apparatus for electrical measurement of angles comprising two relatively-movable members, an annular band of conducting material disposed upon one of said members in form of a closed loop with terminal connections at diametrically opposite points on the loop, and an annular band of conducting material disposed upon the other said member in form of a loop opened at one point to permit terminal connections at opposite ends of the opened loop, said bands being opposite each other in a capacitive relationship, said bands having sufficient resistance per unit length, in conjunction with the distributed capacitance between bands, to provide transmission line characteristics thereto.

2. Apparatus for electrical measurement of angles comprising two relatively-movable members, an annular band of conducting material disposed upon one of said members in form of a closed loop with terminal connections at diametrically opposite points on the loop, and a pair of annular bands of conducting material disposed upon the other said member, one of the pair of bands being opened for terminal connections at a point separated by 90 degrees from the similar open point on the companion band, and the pair of bands being opposite and in capacitive relationship with the band on the first member, said bands having sufficient resistance per unit length, in conjunction with the distributed capacitance between bands, to provide transmission line characteristics thereto.

3. Apparatus for electrical measurement of angles comprising two relatively-movable members, an annular band of conducting material disposed upon each of said members in form of a closed loop, the band on one member having terminal connections at diametrically opposite points on the loop, the band on the other member having terminal connections at three points on the loop spaced 120 degrees apart, the said bands being opposite each other in a capacitive relationship, said bands having sufficient resistance per unit length, in conjunction with the distributed capacitance between bands, to provide transmission line characteristics thereto.

4. Apparatus for electrical measurement of angles comprising a rotor and a stator, an annular band of conducting material disposed upon the rotor in form of a closed loop with terminal connections at diametrically opposite points on the loop, and an annular band of conducting material disposed upon the stator in form of a loop opened at one point to permit terminal connections at opposite ends of the opened loop, said bands being opposite each other in a capacitive relationship, said bands having sufficient resistance per unit length, in conjunction with the distributed capacitance between bands, to provide transmission line characteristics thereto.

5. Apparatus for electrical measurement of angles comprising a rotor and a stator, an annular band of conducting material disposed upon the rotor in form of a closed loop with terminal connections at diametrically opposite points on the loop, and a pair of annular bands of conducting material disposed upon the stator, each stator band being opened for terminal connections at a point separated by 90 degrees from the similar open point on the companion band, and the stator bands being opposite and in capacitive relationship with the band on the rotor, said bands having sufficient resistance per unit length, in conjunction with the distributed capacitance between bands, to provide transmission line characteristics thereto.

6. Apparatus for electrical measurement of angles comprising a rotor and a stator member, an annular band of conducting material disposed upon each of said members in form of a closed loop, the band on the rotor having terminal connections at diametrically opposite points on the loop, the band on the stator having terminal connections at three points on the loop spaced 120 degrees apart, the said bands being opposite each other in a capacitive relationship, said bands having sufficient resistance per unit length, in conjunction with the distributed capacitance between bands, to provide transmission line characteristics thereto.

7. Apparatus for electrical measurement of angles comprising a rotor and a stator, an annular band of conducting material disposed upon the rotor in form of a closed loop with terminal connections at diametrically opposite points on the loop, and an annular band of conducting material disposed upon the stator in form of a loop opened at one point to permit terminal connections at opposite ends of the opened loop, said bands being opposite each other in a capacitive relationship and of different resistances per unit length, said bands having sufficient resistance per unit length, in conjunction with the distributed capacitance between bands, to provide transmission line characteristics thereto.

8. Apparatus for electrical measurement of angles comprising a rotor and a stator, an annular band of conducting material disposed upon the rotor in form of a closed loop with terminal connections at diametrically opposite points on the loop, and a pair of annular bands of conducting material disposed upon the stator, each stator band being opened for terminal connections at a point separated by 90 degrees from the similar open point on the companion band, and the stator bands being opposite and in capacitive relationship with the band on the rotor, the stator bands being of different resistance per unit length from the rotor band, said bands having sufficient resistance per unit length, in conjunction with the distributed capacitance between bands, to provide transmission line characteristics thereto.

9. Apparatus for electrical measurement of angles comprising two relatively-movable members, an annular band of conducting material disposed upon one of said members in form of a closed loop with terminal connections at diametrically opposite points on the loop, and an annular band of conducting material disposed upon the other said member in form of a loop opened at one point to permit terminal connections at opposite ends of the opened loop, said bands being opposite each other in a capacitive relationship and of different resistances per unit length, said bands having sufficient resistance per unit length, in conjunction with the distributed capacitance between bands, to provide transmission line characteristics thereto.

10. Apparatus for electrical measurement comprising two relatively-movable members, an electrically conducting metallic band disposed upon each of said members, and being opposite each other in distributed capacitive relationship, and means for applying an alternating voltage to diametrically opposite points of the band of one member, whereby the magnitude of the potential difference between two points of the other member is a measure of the relative angular position of said members, said bands having sufficient resistance per unit length, in conjunction with the distributed capacitance between bands, to provide transmission line characteristics thereto.

11. Apparatus for electrical measurement comprising two relatively-movable members, an electrically conducting metallic band disposed upon each of said members, and being opposite each other in distributed capacitive relationship, one band being a closed loop and the other an open loop, and means for applying an alternating voltage to diametrically opposite points of the closed loop whereby the magnitude of the potential difference between the ends of the open loop is a measure of the relative angular position of said members, said bands having sufficient resistance per unit length, in conjunction with the distributed capacitance between bands, to provide transmission line characteristics thereto.

12. Apparatus for electrical measurement comprising two relatively-movable members, an electrically conducting metallic band disposed upon each of said members, and being opposite each other in distributed capacitive relationship, both bands being closed loops, and means for applying an alternating voltage to diametrically opposite points of the band of one member, whereby the magnitude of the potential difference between two points of the other member is a measure of the relative angular position of said members, said bands having sufficient resistance per unit length, in conjunction with the distributed capacitance between bands, to provide transmission line characteristics thereto.

13. Apparatus for electrical measurement of angles comprising two relatively-movable members, an annular band of conducting material disposed upon each of said members in form of a closed loop, the band on one member having terminal connections at diametrically opposite points on the loop, the band on the other member having terminal connections at $n$ points on the loop spaced $360/n$ degrees apart, the said bands being opposite each other in a capacitive relationship, said bands having sufficient resistance per unit length, in conjunction with the distributed capacitance between bands, to provide transmission line characteristics thereto.

LOUIS FEIN.

REFERENCES CITED

The following references are of record in the file of this patent:

UNITED STATES PATENTS

| Number | Name | Date |
| --- | --- | --- |
| 1,921,982 | Wittkuhns | Aug. 8, 1933 |
| 2,131,084 | Young | Sept. 27, 1938 |
| 2,132,183 | Oahley | Oct. 4, 1938 |
| 2,256,538 | Alford | Sept. 23, 1941 |
| 2,330,822 | Fischer | Oct. 5, 1943 |
| 2,402,603 | Clark | June 25, 1946 |
| 2,409,449 | Sanders | Oct. 15, 1946 |
| 2,448,642 | Wilburn | Sept. 7, 1948 |
| 2,457,127 | Chesus | Dec. 28, 1948 |